United States Patent
Narita

(10) Patent No.: US 8,496,782 B2
(45) Date of Patent: *Jul. 30, 2013

(54) METHODS FOR PREPARING ALKALI CELLULOSE AND WATER-SOLUBLE CELLULOSE ETHER

(75) Inventor: Mitsuo Narita, Niigata-ken (JP)

(73) Assignee: Shin-Etsu Chemical Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/330,611

(22) Filed: Dec. 9, 2008

(65) Prior Publication Data

US 2009/0165971 A1   Jul. 2, 2009

(30) Foreign Application Priority Data

Dec. 27, 2007   (JP) ................................. 2007-337085

(51) Int. Cl.
*D21C 3/02*   (2006.01)
*C08B 11/00*   (2006.01)
*C08B 15/05*   (2006.01)

(52) U.S. Cl.
USPC ............................... 162/90; 536/84; 536/101

(58) Field of Classification Search
USPC ...................................... 162/90; 536/101, 84
See application file for complete search history.

(56) References Cited

U.S. PATENT DOCUMENTS

| | | | |
|---|---|---|---|
| 3,340,139 A * | 9/1967 | Thomas et al. | 162/72 |
| 2005/0250940 A1* | 11/2005 | Harding et al. | 536/91 |
| 2006/0280882 A1* | 12/2006 | Oka et al. | 428/1.31 |
| 2006/0287518 A1* | 12/2006 | Narita et al. | 536/84 |
| 2007/0144692 A1* | 6/2007 | Narita et al. | 162/90 |
| 2007/0149771 A1* | 6/2007 | Narita et al. | 536/84 |
| 2007/0149772 A1* | 6/2007 | Narita et al. | 536/84 |
| 2007/0149773 A1* | 6/2007 | Narita et al. | 536/84 |
| 2007/0149774 A1* | 6/2007 | Narita et al. | 536/84 |

FOREIGN PATENT DOCUMENTS

| | | |
|---|---|---|
| EP | 1803736 A1 | 7/2007 |
| EP | 1803737 A1 | 7/2007 |
| EP | 1803738 A1 | 7/2007 |
| EP | 1803739 A1 | 7/2007 |
| JP | 1978012954 B | 5/1978 |
| JP | 02-225501 A | 9/1990 |
| JP | 10259201 A | 9/1998 |
| JP | 2001354701 A | 12/2001 |
| WO | WO 98/21246 A1 | 5/1998 |

OTHER PUBLICATIONS

Kim et al, Profiling the wood and pulping properties of southern pine thinning resources, Tappi Journal vol. 4 No. 1, Jan. 2005.*
Anderson et al. "The Evaluation of Pulp Requirements for Continuous Alkali Steeping in the Manufacture of Cellulose Ethers", *Technical Assoc. of the Pulp and Paper Industry* 30(8):548-553 (1956).
Anderson et al. "The Evaluation of Pulp Requirements for Continuous Alkali Steeping in the Manufacture of Cellulose Ethers", *TAPPI* 39(8):548-553 (1956).
Extended European Search Report corresponding to European Application No. 08171010.5 dated Apr. 2, 2009.
Office Action corresponding to Japanese Application No. 2007-337085 dated Jul. 27, 2012.

* cited by examiner

*Primary Examiner* — Eric Hug
*Assistant Examiner* — Jacob Thomas Minskey
(74) *Attorney, Agent, or Firm* — Myers Bigel Sibley & Sajovec, P.A.

(57) ABSTRACT

Provided is a method for preparing cellulose ether which is transparent as dissolved in water and has low water-insoluble content. More specifically, provided are a method for preparing alkali cellulose comprising a contact step of bringing a pulp sheet having a pore volume of 1.0 ml/g or greater, or chips into which the pulp sheet has been converted, into contact with an alkali metal hydroxide solution to obtain an alkali cellulose reaction mixture, and a drain step of draining the alkali cellulose reaction mixture; and a method for preparing water-soluble cellulose ether comprising a step of reacting the alkali cellulose with an etherifying agent.

1 Claim, No Drawings

US 8,496,782 B2

METHODS FOR PREPARING ALKALI CELLULOSE AND WATER-SOLUBLE CELLULOSE ETHER

CROSS-RELATED APPLICATIONS

This application claims priority from Japanese Patent Application No. 2007-337085; filed Dec. 27, 2007, the disclosure of which is incorporated herein by reference in its entirety.

BACKGROUND OF THE INVENTION

1. Field of the Invention

The present invention relates to methods for preparing alkali cellulose and water-soluble cellulose ether having the low insoluble fiber content.

2. Description of the Related Art

Water-soluble cellulose ether is produced by reacting cellulose having, in the molecule thereof, both a crystalline portion and a non-crystalline portion with an etherifying agent to convert the crystalline portion into the non-crystalline portion and thereby making the cellulose ether soluble in water. It is said that crystallinity of cellulose owes to a hydrogen bond between intramolecular hydroxyl groups attributable to the skeleton structure of the cellulose molecule. This hydrogen bond, which is firm, disturbs hydration with a water molecule in water and becomes a cause for making the cellulose water-insoluble. Cellulose ether is prepared by converting the cellulose into alkali cellulose with an aqueous solution of an alkali such as NaOH, thereby breaking its crystallinity; and reacting the alkali cellulose with an etherifying agent to substitute the hydroxyl group of the cellulose by the etherifying agent. The resulting alkali cellulose however does not completely lose crystallinity. It is industrially difficult to substitute all the hydroxyl groups of the cellulose by raising the degree of substitution for ether so that commercially available cellulose ethers are water-soluble but have a water-insoluble portion. The water-insoluble portion sometimes has a fiber scale of pulp, which is a raw material cellulose, exceeding even 1000 μm.

Water-soluble cellulose ether becomes tacky when dissolved in water so that it is used for a thickener for transparent shampoos and rinses, hair styling agents, eye drops, detergents for contact lens and the like. For example, methyl cellulose or hydroxypropyl cellulose, which is water-soluble cellulose ether, has a hydrophilic group and a hydrophobic group in the molecule thereof and thereby shows interfacial activity. It is therefore used as a suspension stabilizer in suspension polymerization of vinyl chloride or vinylidene chloride and becomes useful also as a raw material for transparent plastic wrap for domestic use. Products in such applications are desirably transparent. Unless water-soluble cellulose ether is water-soluble and transparent at the molecular level with regard to an aqueous solution of the water-soluble cellulose ether, defective portions appear in the products and they may lead to inferior transparency or inferior function. An aqueous solution of cellulose ether desirably has a high viscosity. Cellulose ether having a high viscosity has higher insoluble fiber content than cellulose ether having a low viscosity so that it is thought to be difficult to obtain a transparent product.

With a view to overcoming the above-described problems, Japanese Patent Application Examined Publication No. 53-12954/1978 proposes a method comprising a step of allowing a raw material pulp to adsorb an aqueous alkali solution having a concentration of 15 to 75% by weight at 5 to 80° C., and then pressing the resulting pulp within 10 seconds to remove an extra portion of the aqueous alkali solution, a step of repeating the above step to obtain the corresponding alkali cellulose, and a step of reacting the alkali cellulose with an etherifying agent.

Japanese Patent Application Unexamined Publication No. 10-259201/1998 proposes a method comprising steps of impregnating a pulp having dichloromethane extract content of 0.07% by weight or less with sodium hydroxide, pressing the resulting pulp to obtain the corresponding alkali cellulose, and then etherifying the alkali cellulose.

According to Japanese Patent Application Unexamined Publication No. 2001-354701, cellulose ether is produced by a method comprising steps of pulverizing a pulp sheet having a sheet density of 0.4 to 1.0 g/ml into powders having an average particle size of 1000 μm or less, adding an alkali to the powders to yield the corresponding alkali cellulose, and then reacting the alkali cellulose with methyl chloride, propylene oxide and the like.

According to A. W. Anderson and R. W. Swinehart, Tappi, Vol. 39, No. 8, 548-553, August, 1956, presented is a method for producing alkali cellulose, comprising a step of impregnating a pulp sheet having a sheet density of 0.47 to 1.17 g/ml in a bath containing an alkali solution for 0.5 to 4.5 seconds.

SUMMARY OF THE INVENTION

Cellulose ethers satisfactory from the viewpoint of an insoluble fiber content cannot be obtained even by employing any of the methods described in Japanese Patent Application Examined Publication No. 53-12954/1978, Japanese Patent Application Unexamined Publication Nos. 10-259201/1998 and 2001-354701, and A. W. Anderson and R. W. Swinehart, Tappi, Vol. 39, No. 8, 548-553, August, 1956.

The invention has been made in view of the above-described circumstances. An object of the invention is to provide a method for preparing cellulose ether which is transparent when provided as an aqueous solution and has low water-insoluble content.

The present inventors have carried out an extensive investigation with a view to overcoming the above-described problem. As a result, it has been found that cellulose ether which is transparent as dissolved in water and has low water-insoluble content can be prepared by using, as a raw material, alkali cellulose prepared by a method comprising steps of bringing a pulp sheet having a specific pore volume, or chips into which the pulp sheet has been converted, into contact with an excess alkali metal hydroxide, and then removing an extra portion of the alkali metal hydroxide, leading to the completion of the invention.

More specifically, the present invention provides a method for preparing alkali cellulose, comprising a contact step of bringing a pulp sheet having a pore volume of 1.0 ml/g or greater, or chips into which the pulp sheet has been converted, into contact with an alkali metal hydroxide solution to obtain an alkali cellulose reaction mixture and a drain step of draining the alkali cellulose reaction mixture. The invention also provides a method for preparing water-soluble cellulose ether, comprising a step of reacting the alkali cellulose with an etherifying agent.

According to the method for preparing alkali cellulose of the present invention, cellulose ether which is transparent as dissolved in water and has a low water-insoluble content can be produced.

DETAILED DESCRIPTION OF THE PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Hereinafter, preferred embodiments of the present invention will be described. However, it is to be understood that the present invention is not limited thereto.

The pulp sheet to be used in the present invention may be, for example, wood pulp or cotton linter pulp. Pulp derived from wood may be especially preferred in order to obtain cellulose ether having low insoluble fiber content. As the wood, softwood such as pine, spruce and hemlock and hardwood such as eucalyptus and maple can be used.

The pulp sheet to be used in the present invention has a pore volume of 1.0 ml/g or greater, preferably 1.2 ml/g or greater. When the pore volume is lower than 1.0 ml/g, it becomes difficult to prepare cellulose ether having a low insoluble fiber content. The term "pore volume" of a pulp sheet as used herein means the sum of volumes of minute voids per unit weight of a dried pulp sheet as measured by a mercury intrusion technique. The measurement method will next be described. As a measurement analyzer, "Autopore 9520" (trade name; product of Shimadzu Corporation) was employed. A sample is dried beforehand at 105° C. under normal pressure for 2 hours and then cut into strips of about 1.2×2.4 cm. Three of these strips were arranged in triangle in a cell while avoiding overlap with each other during mercury intrusion and a pore volume was measured under the condition of a mercury pressure of 5.5 kPa (corresponding to a pore diameter of about 220 μm) to 411 MPa (corresponding to a pore diameter of about 0.003 μm). Although no limitation is imposed on the upper limit of the pore volume insofar as it is industrially available, it may be usually 2.5 ml/g/ml or less.

The pulp sheet to be used in the invention may have a thickness of preferably from 0.1 to 5 mm, more preferably from 0.5 to 2.0 mm. When the thickness is thicker than 5 mm, pressing may meet with great difficulty. When the thickness is thinner than 0.1 mm, handling may meet with difficulty because the sheet is apt to be broken during pressing. The alpha cellulose content may be preferably 90% by weight or greater. When the alpha cellulose content is less than 90% by weight, an alkali absorption rate may decrease.

In addition, according to the present invention, a dichloromethane extract content of the pulp sheet may be preferably 0.1% by weight or less, more preferably 0.05% by weight or less. When the dichloromethane extract content is higher than 0.1% by weight, an alkali absorption rate may decrease.

The dichloromethane extract content can be measured by the method as described in TAPPI T204, the standards of the organization dedicated to pulp and paper. For example, in accordance with TAPPI T204, 150 ml of dichloromethane and about 10 g of pulp are charged in a Soxhlet extraction flask and at least 24 extraction cycles are performed over 4 to 5 hours while adjusting a heating temperature to give a boiling rate enabling reflux of the solvent at least 6 times per hour. After extraction, the flask is removed from the extraction apparatus and the extracted liquid in the flask is evaporated to become 20 to 25 ml. The extract is then washed with a small amount of a solvent, transferred to a weighing dish, placed in a drier, dried at 105±3° C. for one hour, cooled in a desiccator, and weighed with an accuracy of 0.1 mg, and thus, "oven-dry weight of the extract" is determined. The "oven-dry weight of a blank residue" is also determined by the measurement using a blank composed only of a solvent and weight correction of the extract is performed. The extract content is determined in accordance with the following equation.

$$\text{Extract content (\%)} = \{(\text{oven-dry weight of extract}) - (\text{oven-dry weight of blank residue})\}/(\text{oven-dry weight of pulp}) \times 100$$

The "oven-dry weight of pulp" is determined by transferring pulp to a weighing dish, placing the dish in a drier, drying the pulp at 105±3° C. for 4 hours, cooling it in a desiccator and weighing the dried pulp with an accuracy of 0.1 mg.

Pulp having an intrinsic viscosity of preferably 300 ml/g or greater, more preferably 1000 ml/g or greater as measured in accordance with SCAN-CM 15:99, the standards of the organization dedicated to pulp and paper, may be used. This is because highly viscous cellulose ether has markedly high insoluble fiber content when prepared in the conventional manner.

For example, 25 ml of distilled water is added to a pulp sample (provided in an amount to give [η]c of 3.0±0.1 which will be obtained later) in a vessel and then several pieces of copper wire are added. After a stopper is placed in the vessel, the vessel is shaken until the complete fracture of the pulp. Then, 25.0 ml of a copper ethylenediamine solution is added to the vessel. After removal of air, the vessel is sealed hermetically. The sample solution and a capillary viscometer are adjusted to 25.0° C. The sample solution is introduced into the viscometer. An efflux time $t_n$ is measured and a viscosity ratio $\eta_{rel}$ is calculated in accordance with the following equation:

$$\eta_{rel} = h \times t_n$$

The symbol h is a viscometer constant as determined using a viscometer for calibration, a viscometer for sample measurement and a glycerol solution.

On a numerical table described in SCAN-CM 15:99, [η]c is read from $\eta_{rel}$. Separately, the concentration c (oven-dry pulp concentration) g/ml of the sample solution is calculated and a value obtained by dividing [η]c by c is designated as an intrinsic viscosity [η] ml/g.

As for the preparation of cellulose ether, a method described, for example, in Japanese Patent Application Examined Publication No. 53-12954/1978 may be especially preferred. According to this method, cellulose ether is obtained by impregnating a pulp sheet or pulp chips with an excess alkali metal hydroxide solution, removing an extra portion of the alkali metal hydroxide solution by pressing the resulting pulp sheet or chips to prepare alkali cellulose, and then adding an etherifying agent to the alkali cellulose to cause reaction therebetween. It is difficult to prepare cellulose ether having low insoluble fiber content by using, as raw material, alkali cellulose prepared without impregnating the pulp with an excess alkali metal hydroxide solution.

The pulp chips to be used in the invention have chip shapes and can be obtained by cutting the pulp sheet having a thickness of 0.1 to 5.0 mm. Although no limitation is imposed on the production method of the pulp chips, existing cutters such as a slitter cutter can be used. Cutters capable of cutting the pulp successively may be advantageous from the viewpoint of an investment cost.

The pulp chips may usually have a side of preferably 2 to 100 mm, more preferably 3 to 50 mm. When the side is less than 2 mm, it may be difficult to prepare uniform alkali cellulose because cellulose fibers may be damaged so that an alkali metal hydroxide solution may not smoothly penetrate into the fibers. When the side is greater than 100 mm, it may be difficult to handle the pulp chips, especially to charge them in an impregnating apparatus, move them inside of the apparatus and charge them in a separator.

In the invention, the pulp sheet or the chips into which the pup sheet has been converted is brought into contact with an excess alkali metal hydroxide and then, an extra portion of the alkali metal hydroxide is removed. For example, a method comprising steps of impregnating the pulp sheet or the chips with an excess alkali metal hydroxide solution and then draining to remove the extra portion of the alkali metal hydroxide solution can be used. Examples of the method may include a method comprising steps of impregnating a pulp sheet in a bath containing an alkali metal hydroxide solution and then pressing the resulting sheet with a roller or another apparatus under pressure; and a method comprising steps of impregnating pulp chips in a bath containing an alkali metal hydroxide solution and then pressing the resulting pulp chips by centrifugal separation or another mechanical method. The term "excess alkali metal hydroxide" means an alkali metal hydroxide in an amount exceeding a weight ratio of (alkali metal hydroxide solution)/(cellulose) in the alkali cellulose to be provided for the etherifying reaction in the last step and it allows a weight ratio of an alkali metal hydroxide solution to a solid component in pulp (alkali metal hydroxide solution)/(solid component in pulp) to fall within a range of preferably from 3 to 5,000, more preferably from 10 to 200, still more preferably from 20 to 60. When the weight ratio is less than 3, the alkali metal hydroxide and the pulp may be brought into contact with difficulty. Although no upper limit is determined, a very excess alkali metal hydroxide solution requires excessive equipment so that from the economic viewpoint, it may be typically about 5000.

The reason why the weight of an alkali metal hydroxide solution is used instead of the weight of an alkali metal hydroxide is that it is important for the pulp to physically come into uniform contact with (impregnated with) the alkali metal hydroxide solution, avoiding the existence of pulp not in contact (wetted) with the alkali metal hydroxide solution because of an excessively small amount of the alkali metal hydroxide solution.

Although the alkali metal hydroxide solution to be used in the invention is not limited insofar as alkali cellulose is produced by using it, an aqueous solution of sodium hydroxide or potassium hydroxide may be preferably selected from the economic viewpoint. The concentration of the alkali metal hydroxide solution may be preferably from 23 to 60% by weight, especially preferably from 35 to 55% by weight. The alkali metal hydroxide solution may be preferably an aqueous solution, but it may be a solution in an alcohol such as ethanol or a mixed solution in a water soluble alcohol and water.

The pulp is brought into contact with the alkali metal hydroxide solution at preferably from 5 to 70° C., more preferably from 15 to 60° C. When the temperature is less than 5° C., the alkali metal hydroxide solution has high viscosity so that an absorption rate at which the pulp absorbs the solution may decrease. This may not be preferred from the viewpoint of the productivity. When the temperature is higher than 70° C., the alkali metal hydroxide solution has low viscosity so that an absorption rate at which the pulp absorbs the solution may increase and the composition of the resulting alkali cellulose may vary widely. This may not be preferred from the viewpoint of quality.

The pulp is brought into contact with the excess alkali metal hydroxide for a period of time from 10 to 600 seconds, preferably from 15 to 120 seconds. When the contact time is less than 10 seconds, the composition of the resulting alkali cellulose may vary widely so that it may not be preferred from the viewpoint of quality. When the contact time is more than 600 seconds, the absorption amount of the alkali metal hydroxide into the pulp may increase excessively, which may lead to a failure to produce alkali cellulose having a desired composition.

According to the invention, an amount of the alkali metal hydroxide solution to be used for the contact step is selected so that a ratio of the weight of alkali metal hydroxide component as determined by neutralization titration of the alkali cellulose obtained by the drain step to the weight of solid component in the pulp {(alkali metal hydroxide component)/(solid component in pulp)} falls within a range of preferably 0.3 to 1.5, more preferably 0.65 to 1.30, still more preferably 0.90 to 1.30.

Since the pulp serving as a starting material is typically composed of cellulose and water, the solid component in the pulp is cellulose. When the above-described weight ratio is from 0.3 to 1.5, the resulting cellulose ether can have high transparency.

The solid component in the pulp may include, in addition to cellulose which is a main component, organic matters such as hemicellulose, lignin and resins, and inorganic matters such as Si and Fe components.

With regard to the alkali cellulose obtained by the drain step, the weight ratio of (alkali metal hydroxide component)/(solid component in the pulp) can be determined by the following titration method.

A total weight of a cake of the alkali cellulose obtained by the drain step is measured. First, 4.00 g of the cake of the alkali cellulose obtained by the drain step is sampled and the percent by weight (wt %) of the alkali metal hydroxide contained in the cake is determined by neutralization titration (0.5 mol/L $H_2SO_4$, indicator: phenolphthalein) A blank test is also performed in a similar manner.

Wt % of alkali metal hydroxide=(normality factor)×[{amount (ml) of $H_2SO_4$ added dropwise}−{amount (ml) of $H_2SO_4$ added dropwise in blank test}]

In the above equation, the molecular weight of sodium hydroxide is set at 40.

If the wt % of the alkali metal hydroxide is determined, the "alkali metal hydroxide component" in the total amount of the cake of the alkali cellulose obtained by the drain step can be determined.

The "solid component in the pulp" can be determined, for example, by sampling about 2 g of pulp, drying it at 105° C. for 4 hours, and finding a percentage (wt %) of the weight of the dried pulp in the weight of the sampled pulp.

The weight ratio of (alkali metal hydroxide component)/(solid component in the pulp) of the alkali cellulose obtained by the drain step approximates to a weight ratio of (alkali metal hydroxide component)/(alkali cellulose component in a narrow sense) for the alkali cellulose obtained by the drain step as described below.

The weight ratio of (alkali metal hydroxide component)/(solid component in the pulp) can be determined in accordance with the following equation by using wt % of the alkali metal hydroxide contained in the cake obtained by the drain step.

(wt of alkali metal hydroxide)/(wt of alkali cellulose in a narrow sense)=(wt % of alkali metal hydroxide)÷[{100−(wt % of alkali metal hydroxide)/($B/100$)}×($S/100$)]

wherein B represents the concentration (wt %) of the alkali metal hydroxide solution and S represents the concentration (wt %) of the solid component in the pulp.

In the equation, {100−(wt % of alkali metal hydroxide)/($B/100$)} means wt % of the component contained in the cake but other than the alkali metal hydroxide solution. Assuming that alkali cellulose in a narrow sense is present at a similar wt % to the wt % of the solid component in the pulp, $S/100$ is multiplied to obtain the wt % of the alkali cellulose.

The term "alkali cellulose in a narrow sense" means a concept narrower than the alkali cellulose obtained by the drain step and containing the alkali metal hydroxide, and means the alkali cellulose itself after removal of the alkali metal hydroxide solution.

The alkali cellulose thus obtained can be cut into an adequate size and supplied to an etherification reactor. The etherification reactor may be preferably a reactor where an etherification reaction takes place while grinding the alkali cellulose by a mechanical force until the chips lose their shapes. An etherification reactor having, inside thereof, a stirring mechanism is therefore preferred. Examples of the reactor may include a plough type shovel blade mixer such as a ploughshare mixer. Prior to introducing the alkali cellulose into the etherification reactor, it can be ground in advance using another apparatus having a stirring mechanism inside or a grinder such as a cutter mill.

Examples of the cellulose ether which can be produced by using the resulting alkali cellulose as a starting material may include alkyl celluloses such as water-soluble methyl cellulose (MC); hydroxyalkyl celluloses such as hydroxypropyl cellulose (HPC) and hydroxyethyl cellulose (HEC); hydroxyalkylalkyl celluloses such as hydroxypropylmethyl cellulose (HPMC), hydroxyethylmethyl cellulose (HEMC) and hydroxyethylethyl cellulose (HEEC); and carboxymethyl cellulose and carboxymethyl cellulose sodium (CMC-Na).

Examples of the alkyl cellulose may include methyl cellulose having a methoxyl group (DS) of from 1.0 to 2.2 and ethyl cellulose having an ethoxyl group (DS) of from 2.0 to 2.6.

Examples of the hydroxyalkyl cellulose may include hydroxyethyl cellulose having a hydroxyethoxyl group (MS) of from 0.05 to 3.0 and hydroxypropyl cellulose having a hydroxypropoxyl group (MS) of from 0.05 to 3.3.

Examples of the hydroxyalkylalkyl cellulose may include hydroxyethylmethyl cellulose having a methoxyl group (DS) of from 1.0 to 2.2 and a hydroxyethoxyl group (MS) of from 0.1 to 0.6; hydroxypropylmethyl cellulose having a methoxyl group (DS) of from 1.0 to 2.2 and a hydroxypropoxyl group (MS) of from 0.1 to 0.6; and hydroxyethylethyl cellulose having an ethoxyl group (DS) of from 1.0 to 2.2 and a hydroxyethoxyl group (MS) of from 0.1 to 0.6.

Examples also may include carboxymethyl cellulose having a carboxymethoxyl group (DS) of from 0.2 to 2.2.

It should be noted that alkyl substitution is expressed by DS and hydroxyalkyl substitution is expressed by MS. They each means an average number of moles of an etherifying agent attached to a glucose unit and can be calculated from the results obtained in accordance with the measurement method of the Japanese Pharmacopoeia.

Examples of the etherifying agent may include alkyl halides such as methyl chloride and ethyl chloride; alkylene oxides such as ethylene oxide and propylene oxide; and monochloroacetic acid.

The viscosity of a 2% by weight aqueous solution of the cellulose ether at 20° C. may be preferably from 2 to 30000 mPa·s, more preferably from 300 to 30000 mPa·s.

When cellulose ether is prepared with insufficient degree of substitution or without carrying out uniform substitution, many insoluble fibrous substances having a size of about 16 to about 200 µm inevitably remain when the cellulose ether is dissolved in water. The number of these insoluble fibrous substances can be counted in the following manner. The cellulose ether is dissolved in an aqueous electrolyte solution for coulter counter, ISOTON II (product of Coulter) in a temperature-controlled bath at 25° C. so as to obtain a 0.1% by weight aqueous solution and then, the number of insoluble fibers having a size of 16 µm or greater but not greater than 200 µm present in 2 ml of the resulting solution is counted with an aperture tube of 400 µm in diameter by using a Coulter Counter TA II or a Multisizer manufactured by Coulter. The cellulose ether containing preferably 200 or less, more preferably 100 or less insoluble fibers, as measured in the above manner, is excellent. When the concentration of the cellulose ether is too low to be measured, it is possible to use a high concentration solution for the measurement as needed and convert the result into that in terms of a 0.1% by weight aqueous solution.

The light transmittance of a 2% by weight aqueous solution of the water-soluble cellulose ether of the invention at 30° C. may be preferably 90% or greater, especially preferably 97% or greater when measured using a PC-50 type electrical calorimeter, a cell length of 20 mm, and visible light.

According to the invention, the following cellulose ether may be preferably used from the viewpoint improving its solubility. After shaking 100 g of the cellulose ether powder for 30 minutes in a ro-tap sieve shaker Model No. 429 manufactured by Kansai Wire Netting Co., Ltd. by using a standard sieve No. 100 (with openings of 150 µm) as prescribed by JIS Z8801 at a shaking frequency of 200 cycles/min, a tapping number of 156 taps/min and a stroke of 50 mm, 25% by weight or less of powder residue remains on the sieve.

The invention will hereinafter be described in further detail by Examples and Comparative Examples. It should not be construed that the invention is limited to or by them.

EXAMPLE 1

Alkali cellulose was obtained by impregnating a pulp sheet A derived from wood and having an intrinsic viscosity of 1300 ml/g, a pore volume of 1.1 ml/g and dichloromethane extract content of 0.05% by weight with a 49% by weight aqueous NaOH solution of 40° C. for 35 seconds and pressing the resulting sheet to remove an extra portion of the 49% by weight aqueous NaOH solution. In the impregnation step, a weight ratio of (49% by weight aqueous NaOH solution)/(solid component in pulp) was 200. A weight ratio of (NaOH component of the resulting alkali cellulose)/(solid component in the pulp) was 1.25.

The 20 kg of the resulting alkali cellulose was placed in an internal-stirring type pressure-resistant reactor. After vacuuming, 11 kg of methyl chloride and 2.7 kg of propylene oxide were added thereto to carry out the reaction. The reaction mixture was then washed, dried and ground to yield hydroxypropylmethyl cellulose.

The hydroxypropylmethyl cellulose thus obtained had a degree of methoxyl substitution (DS) of 1.90, a degree of hydroxypropoxyl substitution (MS) of 0.24. A 2% by weight aqueous solution of the hydroxypropylmethyl cellulose had a viscosity at 20° C. of 5000 mPa·s and a light transmittance at 30° C. of 98.0% which was measured using a PC-50 type electrical calorimeter, a cell length of 20 mm and visible light. The number of insoluble fibers having a size of 16 μm or greater but not greater than 200 μm was 100.

EXAMPLE 2

Alkali cellulose was obtained in a similar manner to in Example 1 except that a pulp sheet B derived from wood and having an intrinsic viscosity of 1300 ml/g, a pore volume of 1.2 ml/g and dichloromethane extract content of 0.05% by weight was used and the impregnation time was changed to 30 seconds. A weight ratio of (NaOH component of the resulting alkali cellulose)/(solid component in the pulp) was 1.25. By using the resulting alkali cellulose as a raw material, hydroxypropylmethyl cellulose was obtained in a similar manner to in Example 1.

The hydroxypropylmethyl cellulose thus obtained had a degree of methoxyl substitution (DS) of 1.90 and a degree of hydroxypropoxyl substitution (MS) of 0.24. A 2% by weight aqueous solution of the resulting hydroxypropyl methyl cellulose had a viscosity at 20° C. of 8000 Pa·s and a light transmittance at 30° C. of 98.5%. The number of insoluble fibers having a size of 16 μm or greater but not greater than 200 μm was 60.

EXAMPLE 3

A pulp sheet B derived from wood and having an intrinsic viscosity of 1300 ml/g, a pore volume of 1.2 ml/g, and dichloromethane extract content of 0.05% by weight was converted into chips of 10 mm square. After the resulting pulp chips were impregnated for 30 seconds with a 49% by weight aqueous NaOH solution of 40° C., it was pressed using a rotating basket having a centrifugal effect of 500 to remove an extra portion of the 49% by weight aqueous NaOH solution, whereby alkali cellulose was obtained. In the impregnation step, a weight ratio of (49% by weight aqueous NaOH solution)/(solid component in the pulp) was 15. A weight ratio of (NaOH component of the resulting alkali cellulose)/(solid component in the pulp) was 1.25. Using the alkali cellulose thus obtained as a raw material, hydroxypropylmethyl cellulose was prepared in a similar manner to in Example 1.

The hydroxypropylmethyl cellulose thus obtained had a degree of methoxyl substitution (DS) of 1.90 and a degree of hydroxypropoxyl substitution (MS) of 0.24. A 2% by weight aqueous solution of the hydroxypropylmethyl cellulose had a viscosity at 20° C. of 9000 mPa·s and a light transmittance at 30° C. of 98.5%. The number of insoluble fibers having a size of 16 μm or greater but not greater than 200 μm was 55.

COMPARATIVE EXAMPLE 1

Alkali cellulose was obtained in a similar manner to in Example 1 except that a pulp sheet C derived from wood and having an intrinsic viscosity of 1300 ml/g, a pore volume of 1.0 ml/g, and dichloromethane extract content of 0.05% by weight was used. A weight ratio of (NaOH component of the resulting alkali cellulose)/(solid component in the pulp) was 1.25. Using the resulting alkali cellulose as a raw material, hydroxypropylmethyl cellulose was prepared in a similar manner to in Example 1.

The hydroxypropylmethyl cellulose thus obtained had a degree of methoxyl substitution (DS) of 1.90 and a degree of hydroxypropoxyl substitution (MS) of 0.24. A 2% by weight aqueous solution of the resulting hydroxypropylmethyl cellulose had a viscosity at 20° C. of 7000 Pa·s and a light transmittance at 30° C. of 94.0%. The number of insoluble fibers having a size of 16 μm or greater but not greater than 200 μm was 220.

COMPARATIVE EXAMPLE 2

The pulp sheet B derived from wood and having an intrinsic viscosity of 1300 ml/g, a pore volume of 1.2 ml/g, and dichloromethane extract content of 0.05% by weight was ground with a knife mill to obtain a powdery pulp having an average particle size of 200 μm. The 8.0 kg, on a dry basis, of the resulting powdery pulp was placed in an internal stirring type pressure-resistant reactor. After vacuuming, 20.4 kg of 49% by weight NaOH of 40° C. was sprayed under stirring to prepare alkali cellulose having a weight ratio of (NaOH component)/(solid component in the pulp) of 1.25. Following the preparation, 11 kg of methyl chloride and 2.7 kg of propylene oxide were added to carry out the reaction. The reaction mixture was then washed, dried and ground to yield hydroxypropylmethyl cellulose. The hydroxypropylmethyl cellulose thus obtained had a degree of methoxyl substitution (DS) of 1.90 and a degree of hydroxypropoxyl substitution (MS) of 0.24. A 2% by weight aqueous solution of the resulting hydroxypropylmethyl cellulose had a viscosity at 20° C. of 9000 Pa·s and a light transmittance at 30° C. of 91.0%. The number of insoluble fibers having a size of 16 μm or greater but not greater than 200 μm was 600.

The results are collectively shown in Table 1.

TABLE 1

| | pulp | | pore volume (ml/g) | impregnation | | degree of methoxyl substitution (DS) | degree of hydroxypropoxyl substitution (MS) | viscosity of 2 wt % aqueous solution (mPa·s) | light transmittance (%) | number of insoluble fibers |
|---|---|---|---|---|---|---|---|---|---|---|
| | type | form | | temp. (° C.) | time (sec.) | | | | | |
| Example 1 | A | sheet | 1.1 | 40 | 35 | 1.90 | 0.24 | 5000 | 98.0 | 100 |
| Example 2 | B | sheet | 1.2 | 40 | 30 | 1.90 | 0.24 | 8000 | 98.5 | 60 |
| Example 3 | B | chips | 1.2 | 40 | 30 | 1.90 | 0.24 | 9000 | 98.5 | 55 |
| Comp. Ex. 1 | C | sheet | 1.0 | 40 | 35 | 1.90 | 0.24 | 7000 | 94.0 | 220 |
| Comp. Ex. 2 | B | powder | 1.2 | — | — | 1.90 | 0.24 | 9000 | 91.0 | 600 |

The invention claimed is:

1. A method for preparing water-soluble cellulose ether, comprising:

contacting a pulp sheet having alpha cellulose content of 90% by weight or greater and a pore volume of 1.0 ml/g to 1.2 ml/g, or chips into which the pulp sheet has been converted, an alkali metal hydroxide solution to obtain an alkali cellulose reaction mixture;

draining the alkali cellulose reaction mixture to obtain alkali cellulose; and reacting the alkali cellulose with an etherifying agent.

* * * * *